(12) United States Patent
Chatterjee

(10) Patent No.: US 7,012,616 B1
(45) Date of Patent: Mar. 14, 2006

(54) DISPLAY OF IMAGES WITH TRANSPARENT PIXELS

(75) Inventor: Amit Chatterjee, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/541,458

(22) Filed: Mar. 31, 2000

(51) Int. Cl.
G09G 5/02 (2006.01)

(52) U.S. Cl. .............. 345/592; 345/626; 345/629; 345/634; 345/473

(58) Field of Classification Search ............... 345/768, 345/815, 810, 596, 592, 626, 629, 634, 419, 345/597, 473
See application file for complete search history.

(56) References Cited

U.S. PATENT DOCUMENTS 5,295,200 A * 3/1994 Boyer .................. 382/43
5,909,219 A * 6/1999 Dye ..................... 345/430
6,377,269 B1 * 4/2002 Kay et al. ............. 345/589

OTHER PUBLICATIONS

Adobe, Adobe Photoshop 5.0, 1998, pp. 34, 74, 130, 249-255, 277-278.*
HOWTO: Drawing Transparent Bitmaps, Microsoft Developers Service Network article Q79212, last updated Dec. 20, 1999.
Transparent Bits in Windows NT, Microsoft Developers Service Network article Q89375, last updated Jan. 10, 2000.
Ron Gery, Bitmaps with Transparency, Microsoft Developer Network Technology Group article, Jun. 1, 1992.

* cited by examiner

Primary Examiner—Kimbinh T. Nguyen
(74) Attorney, Agent, or Firm—Klarquist Sparkman, LLP

(57) ABSTRACT

Displaying images having pixels thereof that are meant to be transparent is disclosed. In one embodiment, a method includes a first stage and a second stage. The first stage is performed once, to transform the image and generate a mask thereof. The second stage is performed each time the image is to be displayed, to copy the transformed image and the mask onto the display. In one embodiment, the transparent image is shrunk and/or stretched when displayed. The cases of animated images and dithering for alpha blending are also disclosed and covered by the invention.

24 Claims, 6 Drawing Sheets

MASK

TRANSFORMED IMAGE

COPY MASK TO DISPLAY

COPY TRANSFORMED IMAGE TO DISPLAY

DISPLAY OF IMAGES WITH TRANSPARENT
PIXELS

FIELD OF THE INVENTION

This invention relates generally to images with transparent pixels, and more particularly to the display of such images in a relatively fast manner.

BACKGROUND OF THE INVENTION

Images that are displayed on displays of computers and computerized devices typically are made up of a number of pixels. Each pixel usually has associated with it a color value. For example, with monochrome (black-and-white) pictures, a black pixel may have a value of one, while a white pixel may have a value of zero, such that the color of any pixel can be described with one bit, referred to as the color depth of the pixel. Non-monochrome—viz., color—pixels typically have a greater color depth, made of two, four, eight, or even more bits. For example, pixels that have a color depth of eight bits can take on any of $2^8=256$ different colors.

For an image in a format known in the art as graphics-interchange format (GIF), the color value of each pixel is usually eight bits in length. The color value, however, does not refer to the color depth of the pixel, but instead specifically references a color palette, where each color may be described with a greater depth, such as sixteen, twenty-four, or even thirty-two bits in length. For example, a color value of 116 refers to color number 116 in the color palette, which may be a color that is actually twenty-four bits in length. The use of a color palette typically means that an image using such a palette, such as an image in GIF format, takes up less memory for storage and transmission purposes as compared to images not using a color palette.

Transparent images generally are those that have a portion of the pixels thereof that are meant to be transparent, such that when they are displayed against other images, the parts that are transparent allow any underlying background to be "seen through." For example, an image of a doughnut-type shape may be such that the hole of the doughnut is transparent, such that if the image is displayed against a background, the background is visible within the hole of the doughnut. Usually, for images using color palettes, a palette color is selected as a transparent color. This means that this color can then be used to signify that a pixel of the image having a color value referring to this color is to be transparent when displayed against another image, for example.

A difficulty when displaying an image is that regardless of the shape of what can be considered the main part of the image, the image itself must be a rectangular area. Therefore, a rectangular box usually must be made to contain the shape of the image. Thus, most images in predetermined formats, such as the GIF format, are rectangular, even if the substance (that is, the main part) of the image is not rectangular in nature. For example, an image of an opaque disk may be rectangular in shape, where the parts of the image not corresponding to the disk itself are specified with pixels that are keyed to the predetermined transparent color within the color palette.

Displaying such images that have transparent pixels—that is, images that have pixels that are keyed to the predetermined transparent color within the palette—is commonly performed in current computer applications. For example, many Internet applications, such as browsing web sites using a browser program or browser operating system component, may frequently display images that have transparent pixels. This means that the performance of displaying such transparent images is important for the application itself to perform well. Techniques that improve such transparent image display performance are thus desirable. For this reason, as well as other reasons, there is a need for the present invention.

SUMMARY OF THE INVENTION

The invention relates to displaying transparent images. In one embodiment, a method includes generating a mask of the transparent image, where each pixel of the mask that correspond to a transparent pixel of the image is set to a first predetermined color, and all other pixels are set to a second predetermined color. The image itself is transformed so that each pixel thereof that is transparent is set to the second color as well. In one embodiment, the mask generation and image transformation are performed in a first stage, such that the mask is cached.

Next, the method copies the mask to the location on a display where the image is to be displayed, such that only those pixels of the mask that are set to the second color are copied to the display. The image as has been transformed is then copied to this location such that only pixels of the image other than those set to the second color are copied to the display. In one embodiment, the copying of the mask and the transformed image is performed in a second stage. Where numerous copies of the image are to be displayed at different locations on the display, this means that the first stage only has to be performed once, with the second stage being performed each time the image is to be displayed.

Embodiments of the invention provide for advantages not found within the prior art. The display of images using embodiments of the invention is generally faster than in the prior art. This is because, among other reasons, the caching of the mask means that the mask only has to be generated once, regardless of the number of times the image is to be displayed on the screen. Furthermore, embodiments of the invention can save memory resources as compared to the prior art, because the image is itself transformed in the first stage, as opposed to saving the transformation of the image in another mask, for example.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
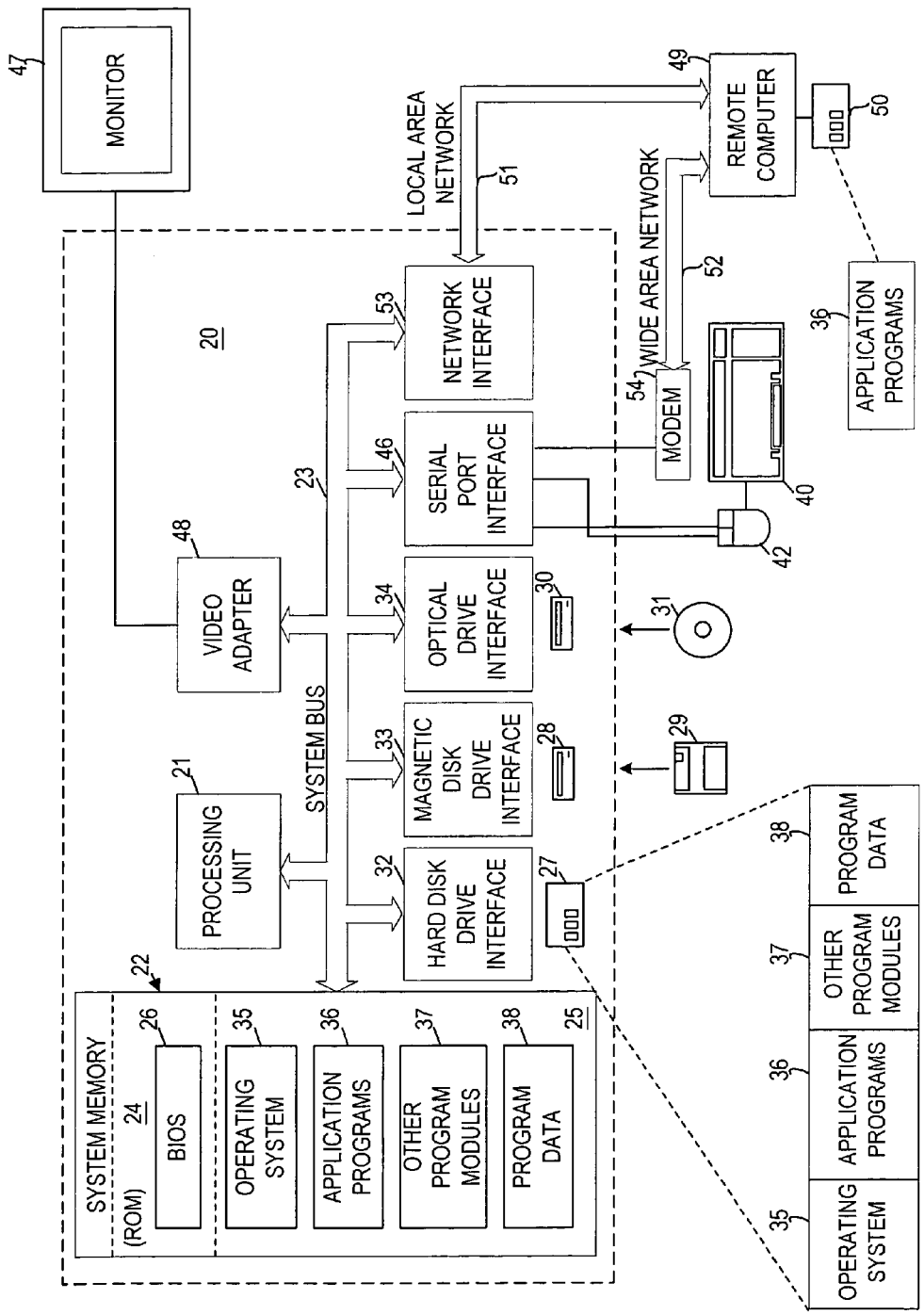
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, ASICs (Application Specific Integrated Circuits), and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, video camera, or the like. These and other input devices are often connected to the processing unit 21 through a serial port interface 46 that is coupled to the system bus, but may be connected by other interfaces, such as a parallel port, game port, an IEEE 1394 port (also known as FireWire), or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Images Using a Color Palette

In this section of the detailed description, description of images that use a color palette, such as transparent images, and that can be used in conjunction with embodiments of the invention, is provided. The description herein is meant for illustrative purposes only, and does not represent a restriction or limitation on the invention itself. The description is made with reference to FIG. 2, which is a diagram of an image that uses a color palette. Such an image can be an image in graphic-interchange-format (GIF), for example. It is noted that while some embodiments are applicable to images using a color palette, the invention is not limited to such images; images that do not use a color palette are amenable to other embodiments of the invention.

Figure 2:
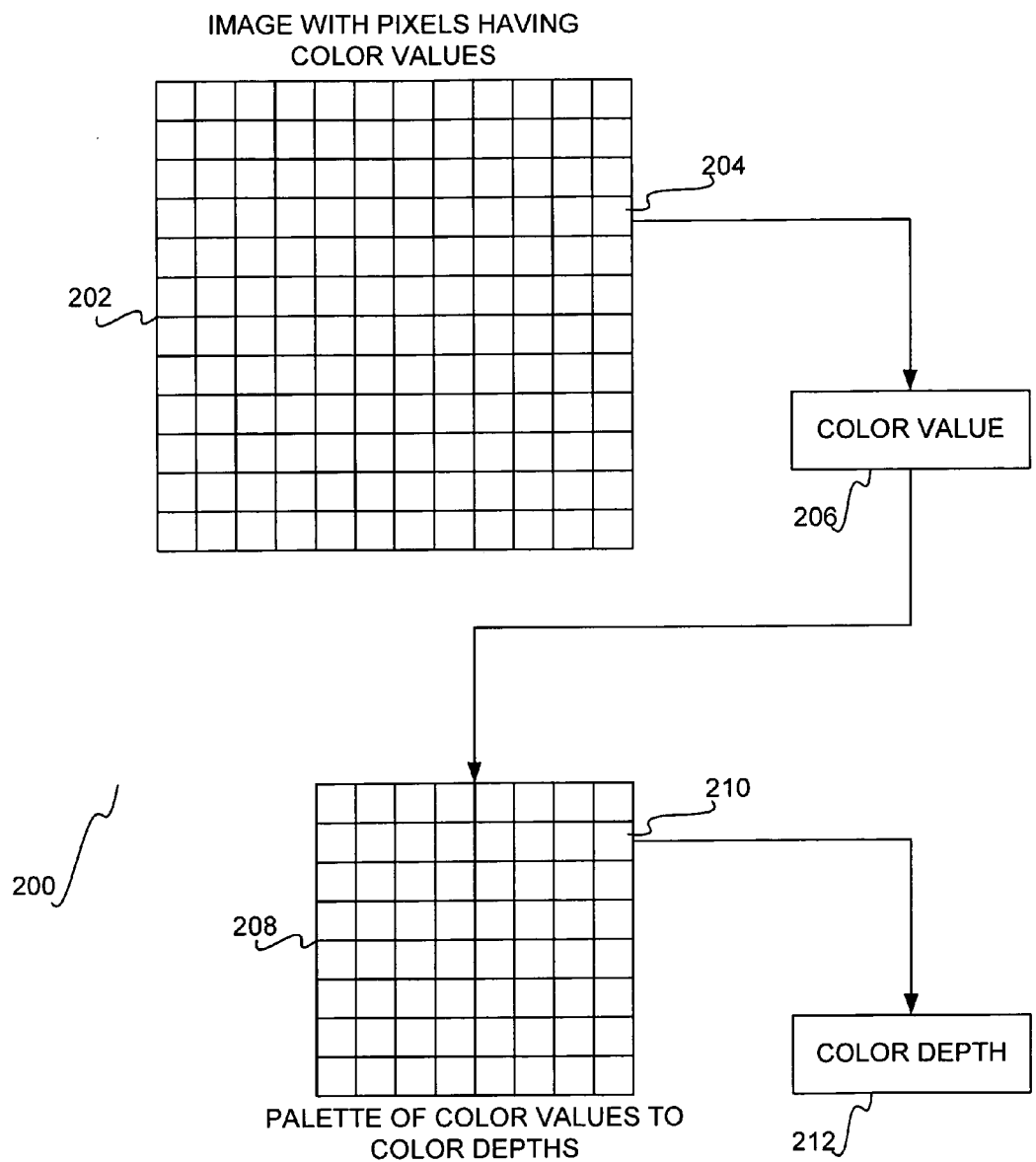
FIG. 2 is a diagram of an image using a color palette.

Referring now to FIG. 2, the image 200 is made up of a plurality of pixels 202 organized into rows and columns. Each pixel has a corresponding color value. For example, the pixel 204 has the corresponding color value 206. The color value 206 references a particular entry within the color palette 208, which is also part of the image 200. Each entry within the palette 208 refers to a particular color having a color depth. For example, the entry 210 has the particular color 212 with a color depth.

Thus, by referencing an entry within the palette 208, each of the pixels 202 is able to take on one of the total number of colors represented by the entries within the palette 208. For example, there may be 256 different entries within the palette 208, such that there are 256 possible different colors that each pixel can take on. Typically, there are more pixels than colors; for example, there may be 64 rows and 64 columns of pixels, for a total of 4,096 pixels, as compared to only 256 colors.

Desirably, one of the colors within the palette 208 signifies transparency. Pixels set to the color value referencing this color are such that when the image itself is displayed against a background or another image, these pixels are transparent, such that they do not overwrite the color of the corresponding pixel of the background or the another image against which the image is being displayed. That is, the background or the another image is "seen through" the image being displayed at the transparent pixels of the image.

In embodiments of the invention applicable to images not using color palettes, a particular color value, which any pixel can take on, can be designated as the transparent color. Embodiments of the invention applicable to images using color palettes are advantageous in the regard that such images typically consume less memory for storage and transmission purposes as compared to images not using color palettes. Again, however, the invention is not limited to images using palettes.

Displaying Transparent Images

In this section of the detailed description, an overview of the manner by which transparent images are displayed is provided. The description provided herein is for illustrative purposes only, and does not represent a limitation or restriction on the invention itself. The description is provided in conjunction with FIG. 3, which is a diagram showing a transparent image being displayed on a display.

Figure 3:
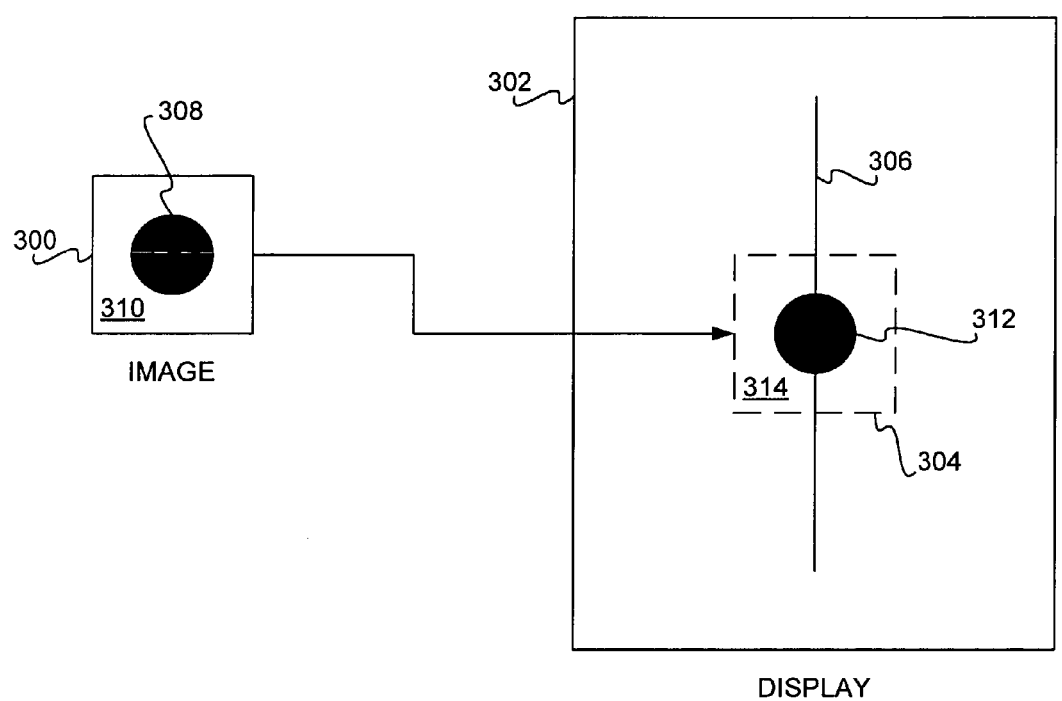
FIG. 3 is a diagram showing the display of a transparent image on a display having a background image.

Referring now to FIG. 3, the image 300 is to be displayed on the display 302, specifically at the location 304 denoted by a dotted-line box. The display 302 already has a background image of a line 306 displayed thereon. The image 300 is made up of two parts: an opaque disk 308 surrounded by a transparent region 310. Each pixel of the disk 308 has a color value corresponding to any of a plurality of entries within a color palette of the image 300 (not shown in FIG. 3) that is not transparent. Each pixel of the transparent region 310, conversely, has a color value corresponding to the entry within the palette of the image 300 that signifies transparency. Thus, the image 300 is referred to as a transparent image.

Therefore, when the image 300 is displayed on the display 302, the opaque disk 308 is copied as the disk 312 on the display 302, such that the disk 312 overwrites that part of the line 306 with which it overlaps. Conversely, the transparent region 310 is copied as the region 314 on the display 302, such that it does not overwrite any part of any image already being displayed on the display 302. Specifically, it does not overwrite any part of the line 306 with which it overlaps, as is shown in FIG. 3. Thus, the transparent region 310 of the image 300, when copied to the display 302, is such that the underlying background image (such as parts of the line 306) is "seen through" the transparent region 310.

In other words, the transparent region 310 is in one embodiment actually not copied at all. Rather, when the image 300 is being copied to the location 304 of the display 302, any pixels that have a color value that corresponds to the transparent color within the color palette, such as all the pixels within the transparent region 310, are skipped, and not copied. That is, they are not actually written to the display 302. Rather, only those pixels that have color values that correspond to non-transparent colors within the color palette are copied, or written, to the display 302.

Method to Display Transparent Images

Figure 4:
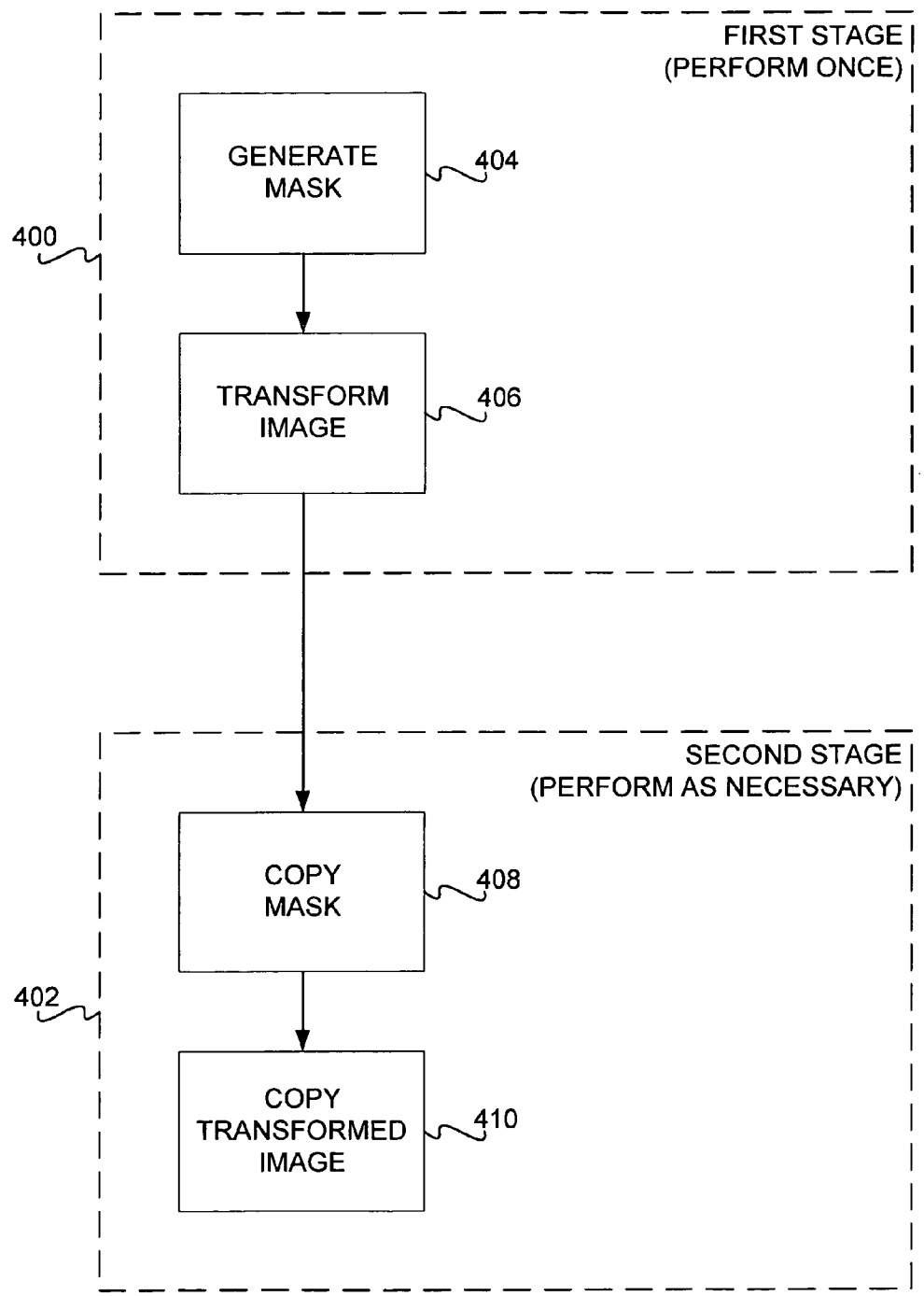
FIG. 4 is a method according to an embodiment of the invention.

In this section of the detailed description, the manner by which transparent images are displayed in accordance with one embodiment of the invention is described. The embodiment is described as a method, which can be a computer-implemented method, and is shown in the flowchart of FIG. 4, to which reference is made. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Referring now to FIG. 4, the method includes a first stage 400 and a second stage 402. The first stage 400 is performed once for displaying an image on a display, regardless of the number of times the image is to be displayed on the display (for example, at different locations on the display). The second stage 402, conversely, is performed each time the image is displayed on the display (for example, at different locations on the display). Generally, the first stage 400 involves generating a mask and transforming the image, such that the mask is desirably cached, while the second stage 402 involves copying the mask and the transformed image to a specific location on a display. Each of these stages is now described in more detail.

The first stage 400 includes 404 and 406. In 404, a mask for the image to be displayed is generated. The mask has a plurality of pixels, corresponding to the plurality of pixels of the transparent image. Each pixel of the mask that corresponds to a transparent pixel of the image is set to a first predetermined color, while all the other pixels of the mask are set to a second predetermined color.

In one embodiment, this is accomplished as follows. There is an object for the mask, such as a device context object, as known within the art, which includes attributes specifying a background color, a text or pen color, and a bitmap. In this embodiment, the background color is set to the first predetermined color, which in one embodiment is white, or binary one. The text or pen color is set to the second predetermined color, which in one embodiment is black, or binary zero. The bitmap in this embodiment is a monochrome bitmap, such that each pixel of the bitmap is one bit in length.

In this embodiment, the mask is generated by transferring the transparent image into the monochrome bitmap, such as by using a block-transfer operation as is known within the art. This transfer results in a mask in which the pixels that match the background color, previously set to the transparent color, are set to the first predetermined color, and all other pixels are set to the second predetermined color. In one embodiment, the mask generated in 404 is referred to as an and mask.

Figure 5:
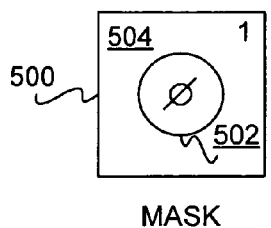
FIGS. 5–8 are diagrams showing graphically the performance of the method of FIG. 4; and, FIG. 9 is a diagram of a system according to an embodiment of the invention.

An example of the mask generated in 404, for the image 300 of FIG. 3 that has been previously described, is shown in the diagram of FIG. 5. Specifically, the mask 500 contains a first region 502, which corresponds to the disk 308 of the image 300 of FIG. 3, and a second region 504, which corresponds to the transparent region 310 of the image 300 of FIG. 3. The first region 502 is labeled "0", because it is set to the second predetermined color, which is binary zero in one embodiment. The second region 504 is labeled "1", because it is set to the first predetermined color, which is binary one in one embodiment.

Referring next to 406 of FIG. 4, the image is transformed. The image is transformed such that each pixel of the image that is transparent is set to the second predetermined color, which as has been described is binary zero in one embodiment. The other pixels of the image are desirably not modified.

In one embodiment, this is accomplished as follows. There is an object for the image, such as a device context object, as known within the art, which includes attributes specifying a background color, a text or pen color, and a bitmap. A block-transfer operation is used with a predetermined and operation, such as an and raster operation as known within the art, to copy the inverse of the and mask onto the bitmap of the image.

Figure 6:
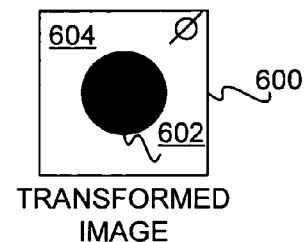

An example of the transformed image in 406, for the image 300 of FIG. 3 that has been previously described, is shown in the diagram of FIG. 6. Specifically, the transformed image 600 contains a first region 602, which corresponds to the disk 308 of the image 300 of FIG. 3, and a second region 604, which corresponds to the transparent region 310 of the image 300 of FIG. 3. The first region 602 is unchanged from the disk 308, because it is unaffected by the transformation. Conversely, the second region 604 is labeled "0", because it is set to the second predetermined color, which is binary zero in one embodiment.

It is noted that in the first stage 400, only one object needs to be created—an object to hold the mask. The object for the image, by comparison, is pre-existing, such that transformation of the image is performed onto the object for the image itself. Desirably, the object for the mask is cached, so that the first stage 400 only needs to be performed once, regardless of the number of times the transparent image is to be displayed, and is followed by successive iterations of the second stage 402. Thus, once the first stage 400 has been performed, the second stage 402 is performed for each location of the display onto which the transparent image is desired to be displayed—for example, a first location, a second location, a third location, etc. The second stage 402 is now described.

The second stage 402 includes 408 and 410. In 408, the mask is copied to a location on a display. Specifically, the mask is copied such that only the pixels of the mask that have been set to the second predetermined color are copied to corresponding pixels of the location on the display. In one embodiment, this is accomplished as follows. There is an object for the location on the display to which the image is to be copied, such as a device context object, as known within the art, having a background color, a text or pen color, and a bitmap. The background color is set to the first predetermined color, such as binary one, and the text or pen color is set to the second predetermined color, such as binary zero. A block-transfer operation is used with a predetermined and operation, such as an and raster operation as known within the art, to copy only the pixels of the mask that have been set to the second predetermined color.

Figure 7:
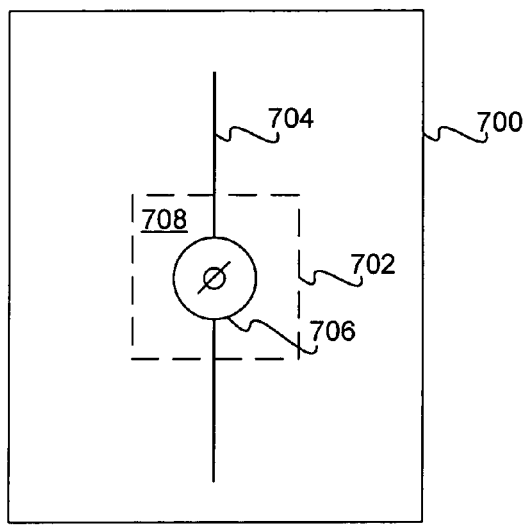

An example of the mask copying performed in 408—specifically, of the mask 500 of FIG. 5 onto the display 302 of FIG. 3—is shown in the diagram of FIG. 7. Specifically, the display 700 has a location 702 to which the mask 500 is copied, and also the line 704 already displayed thereon. There are two regions within the location 702, a first region 706 and a second region 708. The first region 706 has specifically been copied from the region 502 of the mask 500, because the region 502 was set to the second predetermined color, which in one embodiment is binary zero, and thus the region 706 is labeled "0". Conversely, the second region 708 has not been copied from the mask 500, and therefore it remains unaltered.

Referring next to 410 of FIG. 4, the transformed image is copied to the location on the display. Specifically, those pixels of the transformed image other than those that have been set to the second predetermined color are copied onto the display. In one embodiment, this is accomplished as follows. The object for the transparent image, as has been described, is block-transferred using a predetermined block-transfer operation, such as those known within the art, along with a predetermined or operation, such as a source raster paint operation as known within the art, so that only pixels that have not been set to the second predetermined color, such as binary zero, are copied onto the display.

Figure 8:
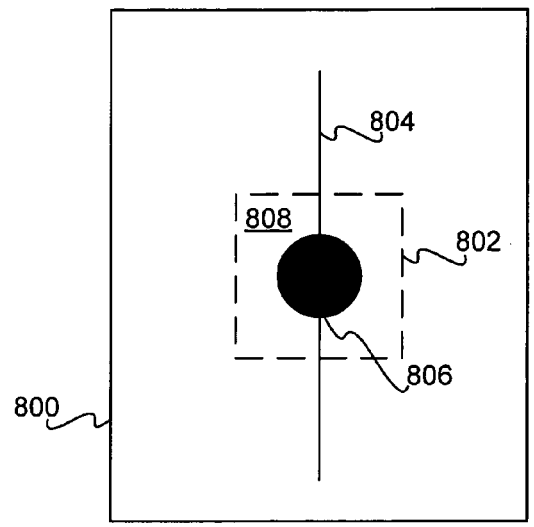

An example of the mask copying performed in 410—that is, of the image 600 of FIG. 6 onto the display 700 of FIG. 7—is shown in the diagram of FIG. 8. Specifically, the display 800 has a location 802 to which the transformed image 600 is copied, and also the line 804 already displayed thereon. There are two regions within the location 802, a first region 806 and a second region 808. The first region 806 has specifically been copied from the transformed image 600, because it corresponds to the region 602 of the mask 600 that was not set to the second predetermined color, which in one embodiment is binary zero. The first region 806 also corresponds to the first region 706 of FIG. 7 onto which the mask 500 of FIG. 5 was previously copied. The second region 808 has not been copied from the image 600.

It is noted that the embodiment of the invention that has been described pertains to a single-frame static image—that is, an image having only one frame, and thus that is not animated. However, other embodiments of the invention can be applied to animated images. For example, for animated images made up of a number of frames meant to be displayed in succession to cause the appearance of animation, each frame can be likened to a single-frame static image, and can be utilized with the embodiment of the invention already described in this section.

It is also noted that the embodiment of the invention described in this section can utilize a block-transfer operation, as has been described. While the block-transfer operation has been implicitly described to copy the image to a location on the display having the same size as the image itself, the invention itself is not so limited. For example, the block-transfer operation may also allow for scaling as well as transferring—either scaling up (making the image larger) or down (making the image smaller). Therefore, embodiments of the invention that utilize such a block-transfer operation can allow for copying an image onto a location on the display which is smaller or larger than the image itself, as can be appreciated by those of ordinary skill within the art.

System

In this section of the detailed description, a computerized system according to an embodiment of the invention is described. The system can be in one embodiment a computer, such as that described as an operating environment in a previous section of the detailed description in conjunction with FIG. 1. The system is described in conjunction with FIG. 9, which is a diagram of such a system.

Figure 9:
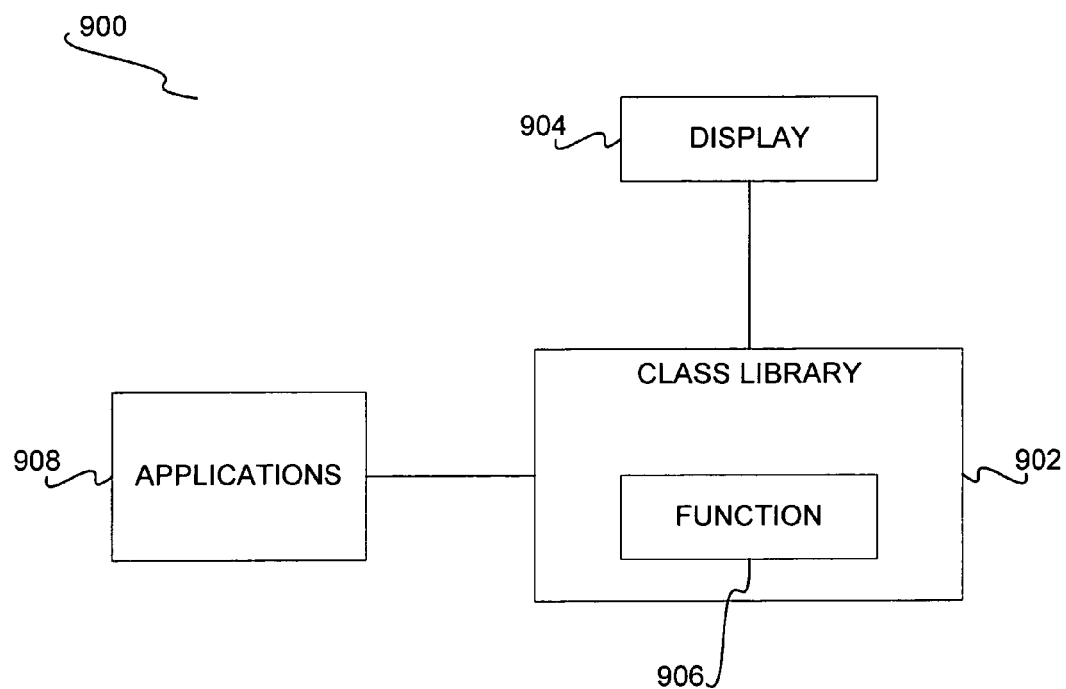

Referring now to FIG. 9, the system 900 includes a class library 902, a display 904, and applications 908. The class library 902 includes a function 906 that is designed to display a transparent image on the display 904, where a mask for the image and a transformation of the image that are both used for displaying the image are cached. Thus, subsequent calls to the function 906 omit regenerating the mask and retransforming the image. The function 906 in one embodiment can display the image as described in the preceding section of the detailed description.

The applications 908 are designed to call the function 906 of the library 902 a number of times, to display the image at different locations on the display. In one embodiment, the applications 908 are computer programs—e.g., application programs—such as Internet web browsing programs or operating system components, etc.; the invention is not so limited. Also in one embodiment, the library 902 includes one or more computer programs. Such programs can be executed by a processor of a computer, from a computer-readable medium, such as a memory, thereof.

Dithering

In the previous sections of the detailed description, the mask is generated such that it is completely based on the image. However, in some graphics applications, such as dithering, or alpha blending, as known within the art, the mask can be generated from both the image and a dithering pattern image. As can be appreciated by those of ordinary skill within the art, a dithering pattern image, such as that which is used in alpha blending, can be combined with a source image to present a dithered resulting image. This is useful in contexts in which, for example, the display does not have as high a color depth as the image itself, such that dithering can achieve the appearance of a higher color depth than is possible.

Where a dithering pattern image, or other pattern image, besides those used in alpha-blending and dithering contexts, is desired to be used, each pixel within the mask is based on a corresponding pixel of the image itself, or a corresponding pixel of the pattern image. For example, 25% of the mask's pixels may be based on corresponding pixels of the image, while 75% may be based on corresponding pixels of the pattern image. Whether a given pixel of the mask is based on a corresponding pixel of the image or the pattern image can be determined by an algorithm, for example, randomly, etc. Other than this modification, displaying a transparent image in accordance with embodiments of the invention is as has been described in preceding sections of the detailed description. In another embodiment, dithering is used because the display system may not be capable of performing alpha blending in the hardware and performing true alpha blending in software can be prohibitively expensive.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, varying embodiments of the invention can be implemented in conjunction with a variety of devices and computers beyond those explicitly described herein, such as embedded systems, Internet appliances, handheld computers, palmtop computers, etc., as can be appreciated by those of ordinary skill within the art. Therefore, it is manifestly intended that this invention be limited only by the following claims and equivalents thereof.

I claim:

1. A computer-implemented method for displaying a transparent image at a location on a display, the transparent image having a plurality of pixels, some of which are transparent, the method comprising:

generating a mask of the transparent image having a plurality of pixels corresponding to the plurality of pixels of the transparent image, such that each pixel of the mask that corresponds to a transparent pixel of the image is set to a first predetermined color, and every other pixel of the mask is set to a second predetermined color;

transforming the transparent image such that each pixel thereof that is transparent is set to the second predetermined color;

copying the mask to the location on the display such that only pixels of the mask that have been set to the second predetermined color are copied to corresponding pixels of the display; and, copying the transparent image as has been transformed to the location on the display such that only pixels of the image other than those set to the second predetermined color are copied to corresponding pixels of the display.

2. The method of claim 1, wherein the method is further for displaying the transparent image at a second location on the display, such that the method further comprises:

copying the mask to the second location on the display such that only pixels of the mask that have been set to the second predetermined color are copied to corresponding pixels of the display; and, copying the transparent image as has been transformed to the second location on the display such that only pixels of the mask other than those set to the second predetermined color are copied to corresponding pixels of the display.

3. The method of claim 2, wherein the method is further for displaying the transparent image at a third location on the display, such that the method further comprises:

copying the mask to the third location on the display such that only pixels of the mask that have been set to the second predetermined color are copied to corresponding pixels of the display; and, copying the transparent image as has been transformed to the third location on the display such that only pixels of the mask other than those set to the second predetermined color are copied to corresponding pixels of the display.

4. The method of claim 1, wherein generating the mask comprises, for an object for the mask having a background color, a text color, and a monochrome bitmap:

setting the background color of the object to the first predetermined color;

setting the text color of the object to the second predetermined color; and, block-transferring the image to the monochrome bitmap.

5. The method of claim 1, wherein transforming the transparent image comprises block-transferring an inverse of the mask onto the image with a predetermined and operation, where the transparent image also has an object therefor having a background color, a text color, and a bitmap.

6. The method of claim 1, wherein copying the mask to the location on the display such that only pixels of the mask that have been set to the second predetermined color are copied to corresponding pixels of the display comprises:

for an object for the location on the display having a background color, a text color, and a bitmap, setting the background color to the first predetermined color and the text color to the second predetermined color; and, block-transferring an object for the mask to the object for the location on the display with a predetermined and operation.

7. The method of claim 1, wherein copying the transparent image as has been transformed to the location on the display such that only pixels of the mask other than those set to the second predetermined color are copied to corresponding pixels of the display comprises block-transferring an object for the transparent image to an object for the location on the display with a predetermined or operation.

8. The method of claim 1, wherein the second predetermined color comprises a logical zero color referred to as black.

9. The method of claim 1, wherein the first predetermined color comprises a logical one color referred to as white.

10. The method of claim 1, further comprising caching the mask of the transparent image.

11. The method of claim 1, wherein the image comprises one of a plurality of frames of an animation.

12. The method of claim 1, wherein the transparent image as displayed at the location on the display is shrunk and/or stretched.

13. A machine-readable medium having instructions stored thereon for execution by a processor to perform a method for displaying a transparent image at at least one location on a display, the transparent image having a plurality of pixels, some of which are transparent, the method comprising:

performing once a first stage comprising:

generating a mask of the transparent image having a plurality of pixels corresponding to the plurality of pixels of the transparent image, such that each pixel of the mask that corresponds to a transparent pixel of the image is set to a first predetermined color, and every other pixel of the mask is set to a second predetermined color;

transforming the transparent image such that each pixel thereof that is transparent is set to the second predetermined color; and, performing for each location at which the image is to be displayed a second stage comprising:

copying the mask to the location on the display such that only pixels of the mask that have been set to the second predetermined color are copied to corresponding pixels of the display; and, copying the transparent image as has been transformed to the location on the display such that only pixels of the mask other than those set to the second predetermined color are copied to corresponding pixels of the display.

14. The medium of claim 13, wherein generating the mask comprises, for an object for the mask having a background color, a text color, and a monochrome bitmap:

setting the background color of the object to the first predetermined color;

setting the text color of the object to the second predetermined color; and, block-transferring the image to the monochrome bitmap.

15. The medium of claim 13, wherein transforming the transparent image comprises block-transferring an inverse of the mask onto the image with a predetermined and operation, where the transparent image also has an object therefor having a background color, a text color, and a bitmap.

16. The medium of claim 13, wherein copying the mask to the location on the display such that only pixels of the mask that have been set to the second predetermined color are copied to corresponding pixels of the display comprises:

for an object for the location on the display having a background color, a text color, and a bitmap, setting the background color to the first predetermined color and the text color to the second predetermined color; and, block-transferring an object for the mask to the object for the location on the display with a predetermined and operation.

17. The method of claim 13, wherein copying the transparent image as has been transformed to the location on the display such that only pixels of the mask other than those set to the second predetermined color are copied to corresponding pixels of the display comprises block-transferring an object for the transparent image to an object for the location on the display with a predetermined or operation.

18. The medium of claim 13, wherein performing once the first stage further comprises caching the mask of the transparent image.

19. A computer-implemented method for displaying a transparent image at a location on a display, the transparent image having a plurality of pixels, some of which are transparent, the method comprising:

generating a mask of the transparent image having a plurality of pixels corresponding to the plurality of pixels of the transparent image, such that each pixel of the mask that corresponds to a transparent pixel of one of the transparent image and a pattern image is set to a first predetermined color, and every other pixel of the mask is set to a second predetermined color;

transforming the transparent image such that each pixel thereof that is transparent is set to the second predetermined color;

copying the mask to the location on the display such that only pixels of the mask that have been set to the second predetermined color are copied to corresponding pixels of the display; and, copying the transparent image as has been transformed to the location on the display such that only pixels of the mask other than those set to the second predetermined color are copied to corresponding pixels of the display.

20. The method of claim 19, wherein the pattern image comprises a dithering pattern image.

21. The method of claim 19, wherein the pattern image comprises a dithering pattern image used in alpha blending.

22. A computer comprising:

a display;

a class library having a function designed to display a transparent image on the display, the function caching a mask for the image and a transformation of the image used for displaying the image, such that subsequent calls to the function for displaying the image omit regenerating the mask and retransforming the image, wherein the function further generates the mask such that the mask has a plurality of pixels corresponding to the plurality of pixels of the transparent image, such that each pixel of the mask that corresponds to a transparent pixel of the image is set to a first predetermined color, and every other pixel of the mask is set to a second predetermined color, and wherein the function further transforms the transparent image such that each pixel thereof that is transparent is set to the second predetermined color; and, an application program designed to call the function of the class library a plurality of times to display the image at different locations on the display.

23. The computer of claim 22, wherein the class library comprises at least one computer program executed by a processor of the computer from a computer-readable medium thereof.

24. The computer of claim 22, wherein the function is to display the image by copying the mask to the location on the display such that only pixels of the mask that have been set to the second predetermined color are copied to corresponding pixels of the display, and by copying the transformation of the image to the location on the display such that only pixels of the transformation other than those set to the second predetermined color are copied to corresponding pixels of the display.

* * * * *

UNITED STATES PATENT AND TRADEMARK OFFICE
CERTIFICATE OF CORRECTION

| | | |
|---|---|---|
| PATENT NO. | : 7,012,616 B1 | Page 1 of 1 |
| APPLICATION NO. | : 09/541458 | |
| DATED | : March 14, 2006 | |
| INVENTOR(S) | : Chatterjee | |

It is certified that error appears in the above-identified patent and that said Letters Patent is hereby corrected as shown below:

In column 2, line 15, delete "correspond" and insert -- corresponds --, therefor.

In column 13, line 8, in Claim 17, delete "method" and insert -- medium --, therefor.

Signed and Sealed this

Thirteenth Day of April, 2010

David J. Kappos
*Director of the United States Patent and Trademark Office*